(No Model.)
S. SALTER.
SKELETON MOLDBOARD FOR PLOWS.
No. 537,938. Patented Apr. 23, 1895.
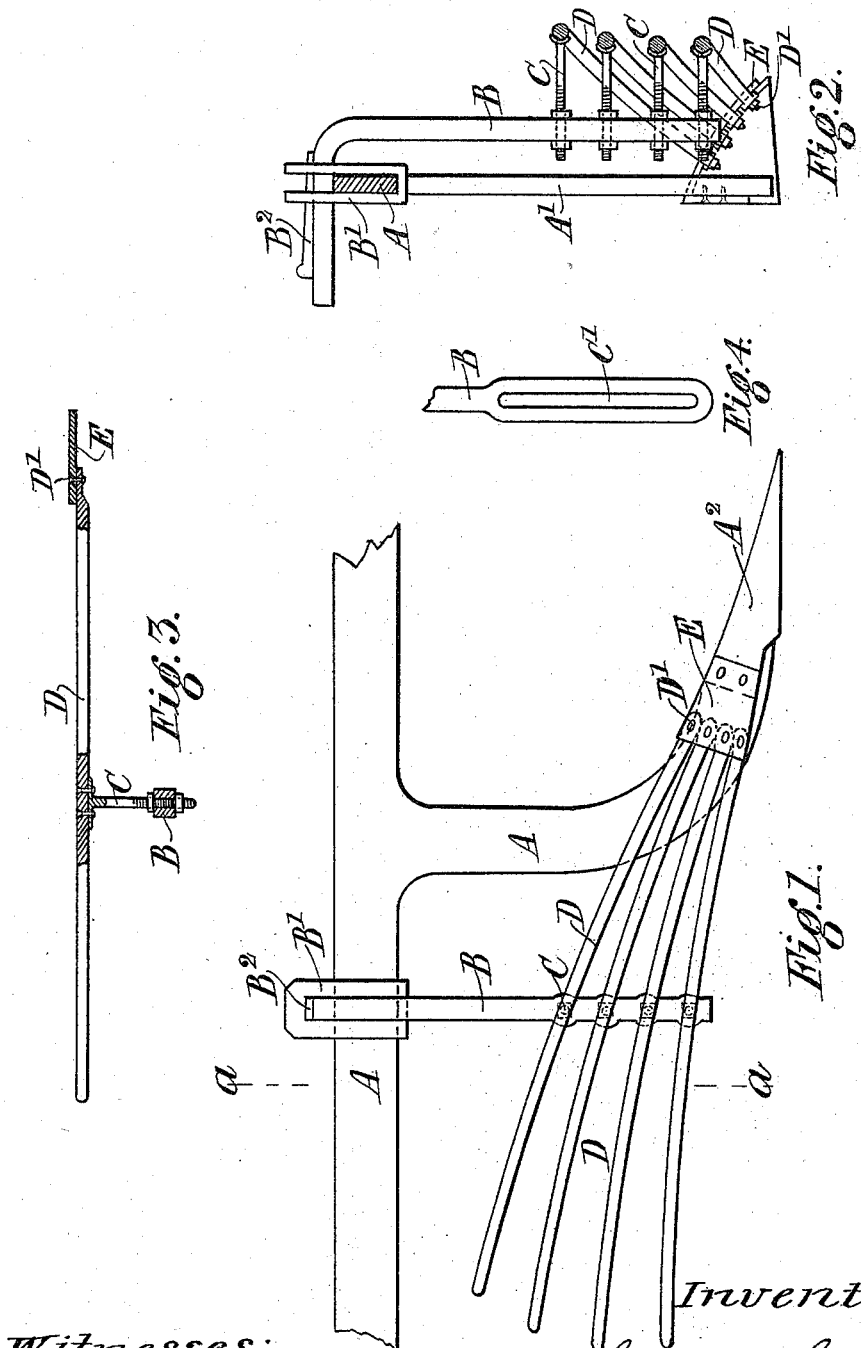
Witnesses:
E. B. Bolton
E. K. Sturtevant
Inventor:
Samuel Salter
By [signature]
his Attorneys.

United States Patent Office.

SAMUEL SALTER, OF WAL WAL, VICTORIA.

SKELETON MOLDBOARD FOR PLOWS.

SPECIFICATION forming part of Letters Patent No. 537,938, dated April 23, 1895.

Application filed December 27, 1894. Serial No. 533,070. (No model.) Patented in Victoria May 28, 1894, No. 11,366.

*To all whom it may concern:*

Be it known that I, SAMUEL SALTER, farmer, a subject of Her Majesty the Queen of Great Britain and Ireland, and a resident of Wal Wal, near Stawell, in the British Colony of Victoria, have invented certain new and useful Improvements in Skeleton Moldboards for Plows, (for which I have obtained in the Colony of Victoria Letters Patent No. 11,366, dated May 28, 1894,) of which the following is a specification.

This invention relates to those mold boards for plows which are made of skeleton form—that is, instead of their being formed from a solid sheet of metal, they are made up of backwardly projecting prongs or rods that are set to the curvature of the ordinary mold board. These mold boards are extremely useful in sticky or tenacious soils and can be worked during wet or moist weather and further by reason of the small frictional surface on the soil the draft power requisite is considerably less than is required with the solid plate mold boards.

My improvements consist, first, of the means employed for securing and supporting the back part of each round rod or prong forming the moldboard and in such a manner that their angle and pitch can be adjusted, and, second, of the means employed for securing the fore end of each round or prong to the foot or share plate.

In the attached drawings, Fig. 1 is a side view of a mold board constructed according to my invention, and Fig. 2 is an end view of same looking forward from line $a$ $a$ Fig. 1. Fig. 3 is a view of one prong and showing the mean employed for securing it in position, while Fig. 4 shows an alternative form of supporting bar.

A is the plow beam, A′ its foot, and A² the share.

B is a bent bar or bracket the top part of which is secured by a clamp B′ and key B² to the plow beam. The bracket B is arranged at about the position shown in Fig. 1 and it has four holes in it to receive the screw stays C which are furnished with double nuts as shown. Said stays have a solid T head on them which is riveted at about midway of its length as shown in Fig. 3 to the prong D which it is to support. The fore end of each prong has an eye formed on it in order that it may be secured to a plate E by a countersunk head bolt D′. The said plate E may be made as a backward extension from the foot or share or it may be riveted or otherwise secured thereto.

Fig. 4 shows the bar B provided with a long slot C′ in place of holes as shown in Fig. 1, to receive the screw stays C.

The bars or prongs D forming the skeleton mold board are round and preferably made of steel, and I find it a great advantage to have each prong adjustably secured in position by the screw stay C and bracket B, and with an eye at its fore end instead of all the prongs being welded and made a fixture to a support or plate thereat. By having each prong separately fixed I can adjust each or remove either one or the other as in some classes of soil only three or even two may be necessary and further by the bracket B being kept say four inches clear of the prongs it allows freedom for the soil and the prongs are less liable to get clogged and so interfere with the proper working of the mold board.

Having now described my invention, what I claim as new, and desire to secure by Letters Patent, is—

1. In combination with the plow frame and share, the prongs D pivotally connected with the share, a bracket B and a series of adjustable supports for said prongs, substantially as described.

2. In combination with the plow frame and share, the prongs D, the bracket B, and the horizontal stay C for supporting the prongs, substantially as described.

In witness whereof I have hereunto set my hand in the presence of two witnesses.

SAMUEL SALTER.

Witnesses:
 BEDLINGTON BODYCOMB,
 D. R. BODYCOMB.